(12) United States Patent
Galea

(10) Patent No.: US 10,617,052 B1
(45) Date of Patent: Apr. 14, 2020

(54) SHOVEL WITH BASE

(71) Applicant: Sonny S. Galea, Harrow (CA)

(72) Inventor: Sonny S. Galea, Harrow (CA)

( * ) Notice: Subject to any disclaimer, the term of this patent is extended or adjusted under 35 U.S.C. 154(b) by 0 days.

(21) Appl. No.: 16/356,524

(22) Filed: Mar. 18, 2019

Related U.S. Application Data

(60) Provisional application No. 62/791,094, filed on Jan. 11, 2019.

(51) Int. Cl.
*A01B 1/02* (2006.01)
*A01B 1/04* (2006.01)

(52) U.S. Cl.
CPC . *A01B 1/02* (2013.01); *A01B 1/04* (2013.01)

(58) Field of Classification Search
CPC .... A01B 1/02; A01B 1/04; A01B 1/06; A01B 1/08; E02F 3/02; B25G 3/00; B25G 3/02
USPC ............................. 294/49; 172/375, 376, 377
See application file for complete search history.

(56) References Cited

U.S. PATENT DOCUMENTS

| | | | | |
|---|---|---|---|---|
| 270,016 A | * | 1/1883 | Chambard | |
| 272,087 A | * | 2/1883 | Rothman | |
| 320,136 A | * | 6/1885 | Iwan et al. | |
| 528,607 A | * | 11/1894 | Peat | |
| D25,918 S | * | 8/1896 | Hepsher | |
| 976,970 A | * | 11/1910 | Wolary | |
| 1,175,860 A | * | 3/1916 | Babendreer | A01B 1/08 172/381 |
| 1,259,944 A | * | 3/1918 | Welch, Jr. | A01B 1/08 172/371 |
| 1,279,704 A | * | 9/1918 | Jones | A01B 1/08 172/371 |
| 1,823,438 A | * | 9/1931 | Craig | A01B 1/06 172/372 |
| 2,141,533 A | * | 12/1938 | Hubbell | A01B 1/06 172/375 |
| 2,251,048 A | * | 7/1941 | Garland | A01B 1/06 172/372 |
| 2,253,116 A | * | 8/1941 | Findlay | A01G 3/06 172/13 |
| 2,771,019 A | * | 11/1956 | Zeitz | A01B 1/08 172/372 |
| 2,795,923 A | * | 6/1957 | Kapuczin | A01B 1/20 56/400.05 |
| 3,782,770 A | * | 1/1974 | Lee | A01B 1/02 172/378 |
| 3,797,581 A | * | 3/1974 | Holloway | A01B 1/20 172/372 |
| 5,004,053 A | * | 4/1991 | Martell | A01B 1/20 172/375 |

(Continued)

*Primary Examiner* — Dean J Kramer
(74) *Attorney, Agent, or Firm* — Borden Ladner Gervais LLP; Geoffrey deKleine

(57) ABSTRACT

A shovel includes a continuously curved blade comprising a curved central portion that extends from a first cutting edge to a second cutting edge and a first curved wing and a second curved wing disposed along a curved central portion. The shovel also includes a base operably coupled to the continuously curved blade and comprising a first side wall coupled to a concave surface of the first curved wing, a second side wall spaced from the first side wall and coupled to a concave surface of the second curved wing, and a third side wall coupled to the curved central portion, wherein the third side wall extends from the first side wall and the second side wall toward the first cutting edge.

20 Claims, 8 Drawing Sheets

(56) References Cited

U.S. PATENT DOCUMENTS

| | | | | |
|---|---|---|---|---|
| 5,395,147 A | * | 3/1995 | Brown | A01B 1/02 248/101 |
| 5,529,129 A | * | 6/1996 | Byrd | E02F 3/02 172/377 |
| 5,791,708 A | * | 8/1998 | Capriotti | E02F 3/02 172/377 |
| 6,044,914 A | * | 4/2000 | Johnson | A01B 1/00 172/377 |
| 6,109,362 A | * | 8/2000 | Simpson, Sr. | E02F 3/02 172/375 |

* cited by examiner

US 10,617,052 B1

SHOVEL WITH BASE

CROSS REFERENCE TO RELATED APPLICATIONS

This application claims the benefit of provisional patent application Ser. No. 62/791,094, filed Jan. 11, 2019, the contents of which are incorporated herein by reference.

TECHNICAL FIELD

The embodiments relate to a shovel, more particularly, to a shovel with a base.

Background

When faced with the task of digging a trench, one must usually have an array of tools at his/her side. Depending on the width and depth of the trench to be dug, one can also expect to be changing position to chop, dig, and move dirt.

Brief Description

The shovel, in one embodiment, includes a blade having an open front end, an open rear end opposite to the open front end, a first lateral edge and a second lateral edge, the first lateral edge and the second lateral edge extending between the open front and open rear ends, the open front end and the open rear end including a ground engaging edge such that both the open front end and the open rear end of the shovel are configured for performing at least one of ground engaging operation.

In one embodiment, the shovel includes: a base having a first end connected to an upper surface of the blade and a second end opposite to the first end, the base being positioned on the upper surface of the blade between the front end, the rear end, the first lateral edge and the second lateral edge of the blade, and at a suitable distance from the front open end, the rear open end and the first and second lateral edges so that the front open end, and the rear open end can operatively engage the ground, a sleeve extending from the second end of the base, and a handle secured to the sleeve.

In another embodiment of the shovel, the blade is upwardly concave.

In another embodiment of the shovel, the blade is ovoid shape with the first edge and the second edge meeting at the front end and at the rear end of the blade.

In another embodiment of the shovel, the blade includes a central flat portion extending between the front open end and the rear open end, and two upwardly wings extending from lateral sides of the central flat portion.

DETAILED DESCRIPTION

Figure 1:
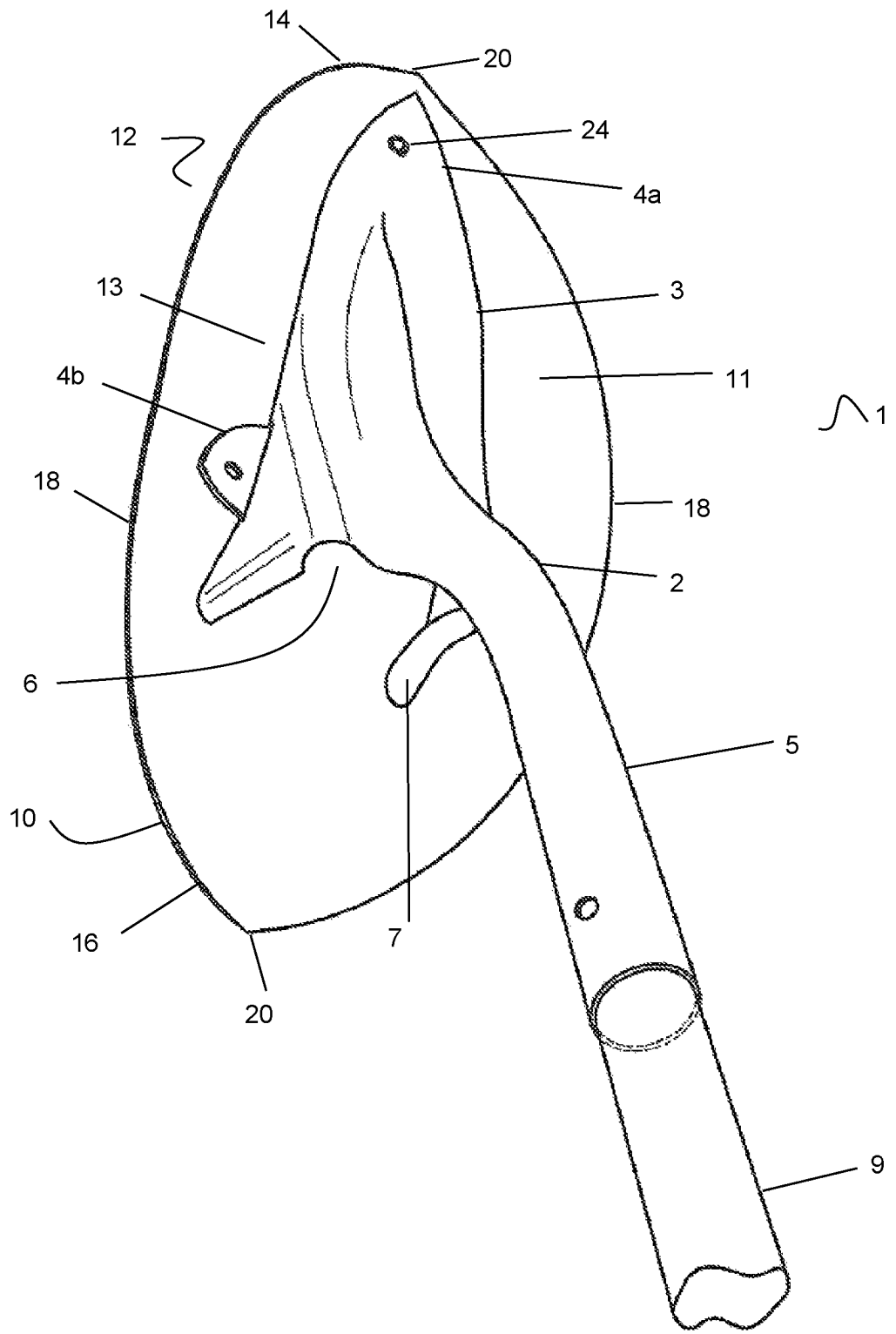
FIG. 1 is a perspective view of a shovel according to one embodiment.

In order to aid in understanding, the following illustrative, non-limiting, examples are provided.

For the purposes of this specification and appended claims, unless otherwise indicated, all numbers expressing amounts, sizes, dimensions, proportions, shapes, formulations, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

The term "substantially", when used in this document, includes exactly the term it modifies and slight variations therefrom. For example, the term "substantially similar in shape" means exactly the same shape and slight variations therefrom.

"First end" or "front end" refers to the end of the shovel blade facing away from the user. "Second end" or "rear end" refers to the end of the shovel blade that faces the user.

Various apparatuses will be described below to demonstrate examples of embodiments Any invention disclosed below that is not claimed in this document may be the subject matter of another protective instrument, for example, a continuing patent application, and the applicants, inventors, or owners do not abandon, disclaim, or dedicate to the public any such invention by its disclosure in this document.

In one embodiment a blade and in another embodiment a shovel having a blade that can be used as a trenching tool for digging a trench without the need of multiple apparatuses. The shovel includes a blade having opposite first and second open ends, and two lateral sides, while a shaft for the handle extends from a position of the blade at a suitable distance from the first open end, the second open end, and the lateral edges such that the first open end, and the second open end can interact or engage with the ground, and perform operations such as hoeing, chopping, excavating, scooping dirt, and so forth. Furthermore, having a forward cutting edge at the front end and a backward cutting edge at the back or rear end allows the user to avoid changing positions around the site being worked on. The front end and the back end can be of similar shape or of different shapes. For example, both ends can be pointed or both having a straight edge. Alternatively one end can have a straight edge, while the other is pointed. The shovel, in another embodiment, includes edges that can be equipped with serrated teeth or bluntness depending on the terrain or landscape and a carrier attached for securing a handle. The carrier can be used as a surface on which the user could place his or her foot to apply pressure and dig. The rear portion of the blade could be used for hoeing, chopping, and scooping dirt in reverse or by pulling backwards.

Figure 2:
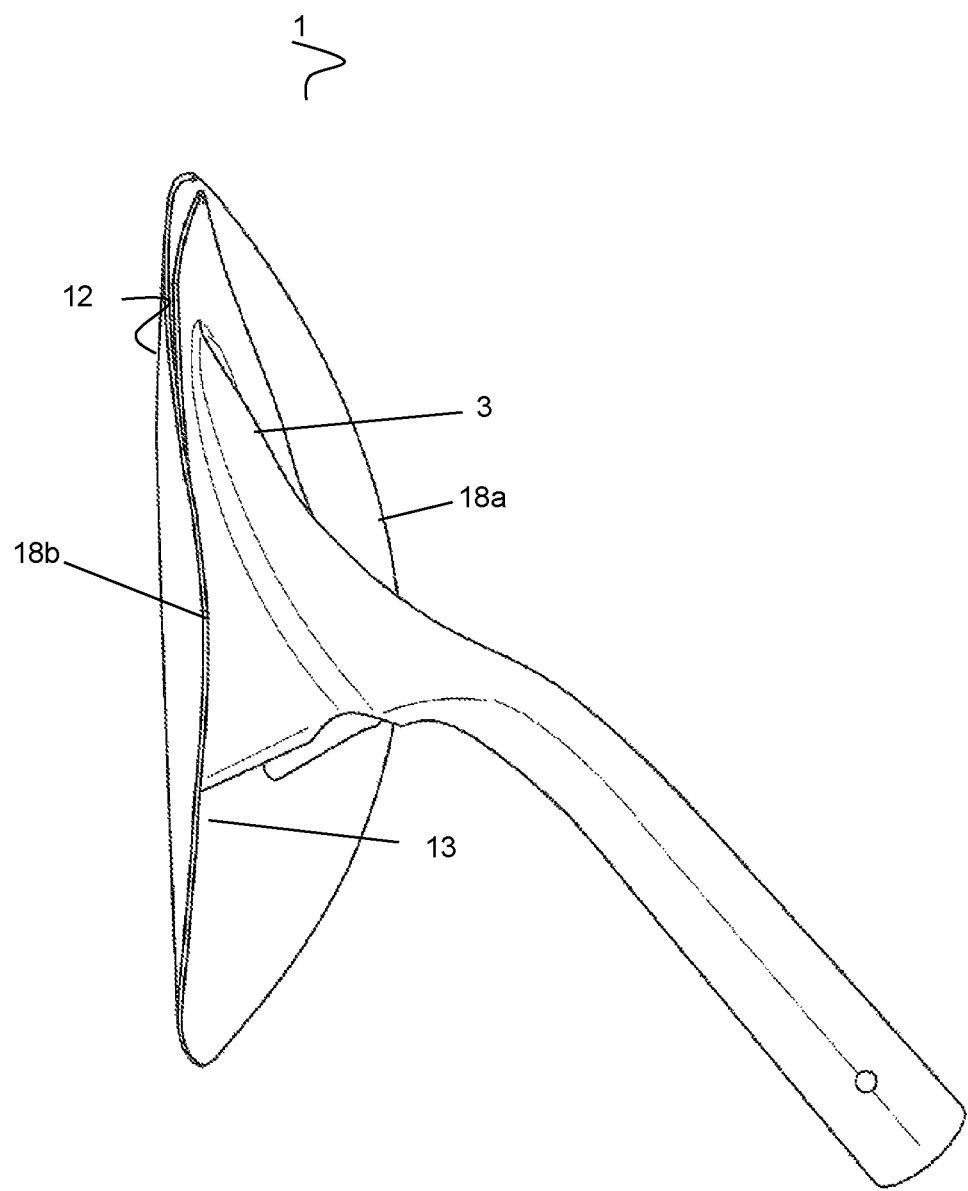
FIG. 2 is a side view of a shovel according to one embodiment.
Figure 3:
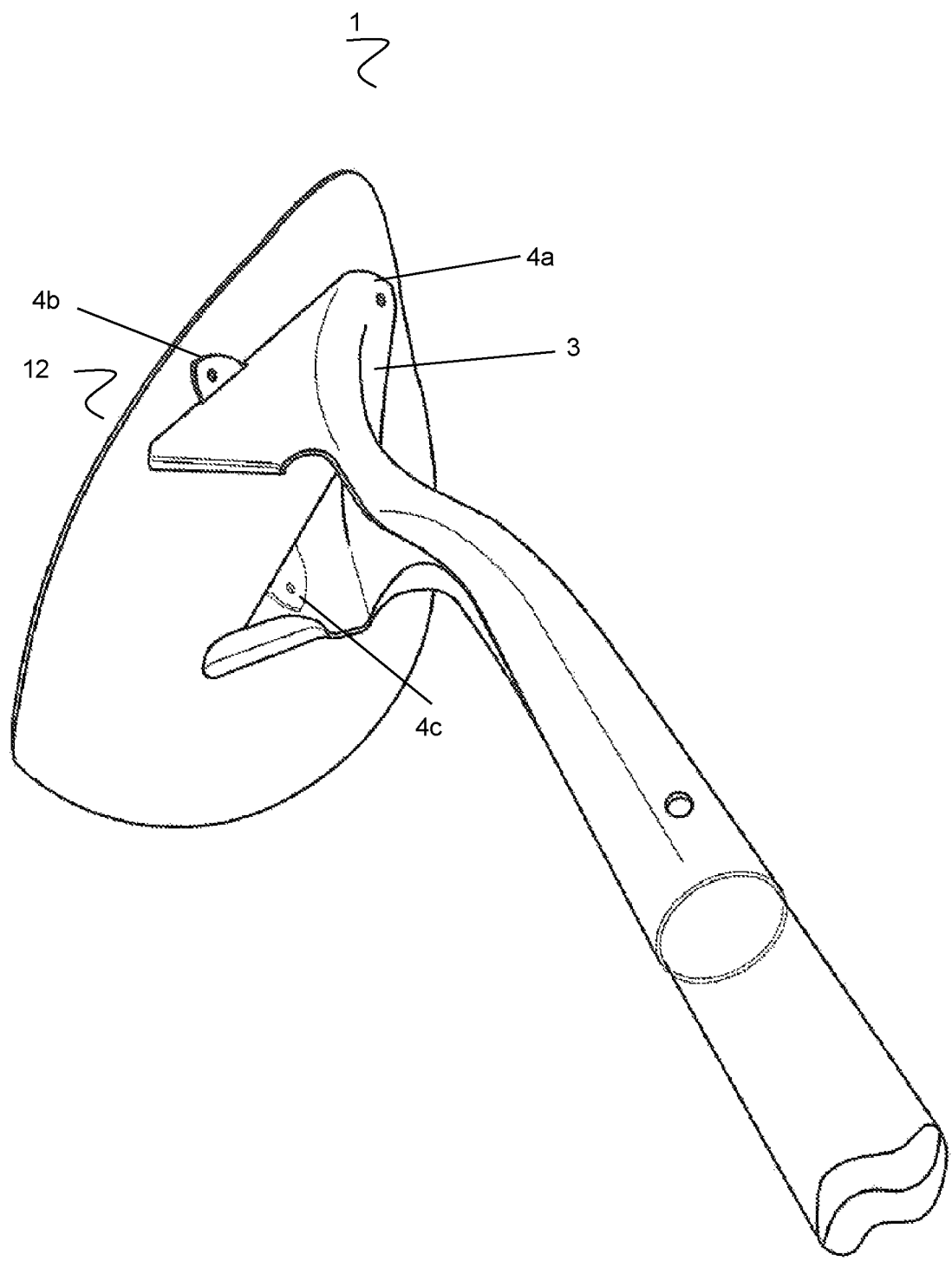
FIG. 3 is a perspective view of a shovel according to one embodiment.

With reference to FIGS. 1 to 3, a blade 12 according to one embodiment comprises an upper side or upper surface 11 opposite to a bottom surface 10 that faces the ground when the shovel is being used, a front end 14, a rear end 16 opposite to the front end 14, and side edges 18a,b extending between the front and rear ends 14, 16. The blade includes a central portion 13 that extends longitudinally between the front end 14 and the rear end 16 and that curves laterally and upwardly to form raised lateral or side edges 18a,b. The blade 12 has a generally U shaped cross section from side edge to side edge. The blade 12 is upwardly concave. That is, the upper surface 11 of the blade 12 is concave.

In one embodiment, the blade can take an ovoid shape with the first lateral edge 18a and the second lateral edge 18b meeting at the front end 14 and at the rear end 16 of the blade 12.

The front open end 14 and the rear open end 16 can be identical in shape or substantially similar in shape, or have different shapes. The front end 14 and the rear end 16 can be configured for a variety of operations such as digging, piercing, excavating, scooping, and so forth. In the embodiment shown in FIGS. 1 to 3, both the front and rear ends 14, 16 include a sharp pointed tip 20 to facilitate piercing the ground or scooping dirt.

Figure 5:
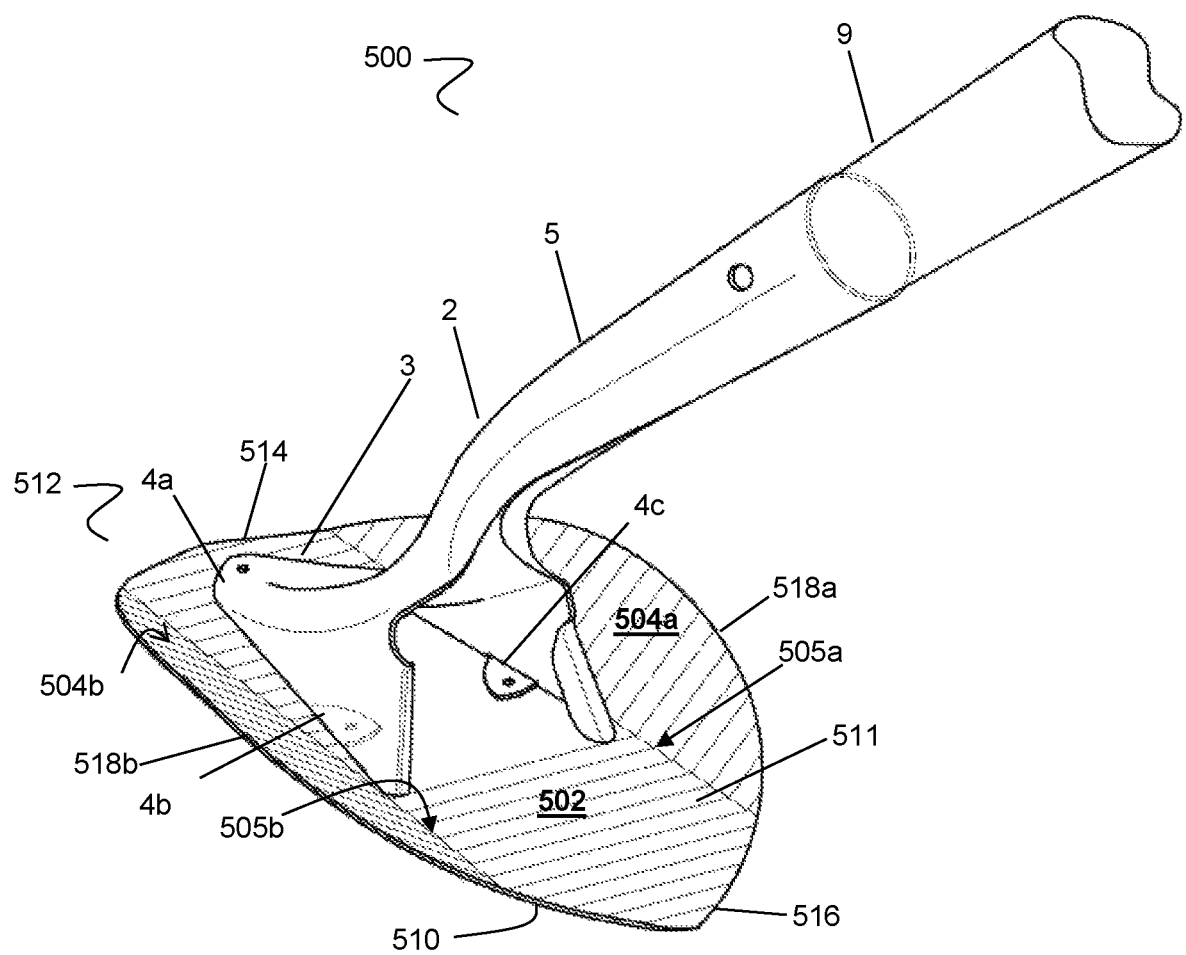
FIG. 5 is a perspective view of a shovel with a flat central portion according to one embodiment.

With reference to FIG. 5, illustrated is a blade 512 according to another embodiment. The blade 512 comprises an upper side or upper surface 511 opposite to a bottom surface 510 that faces the ground when the blade is used, a front end 514, a rear end 516 opposite to the front end 514, and lateral edges 518a,b extending between the front and rear ends 514, 516. According to this embodiment, the blade 512 includes a generally flat central portion 502 that extends longitudinally between the front end 514 and the rear end 516 and two upturn lateral wings or side walls 504a,b. The lateral wings 504a,b extending upwardly from the lateral sides 505a,b of the central portion 502. The lateral wings 504a,b may form a slope from the edges 518a,b to the lateral sides 505a,b or may form a vertical wall.

Figure 6:
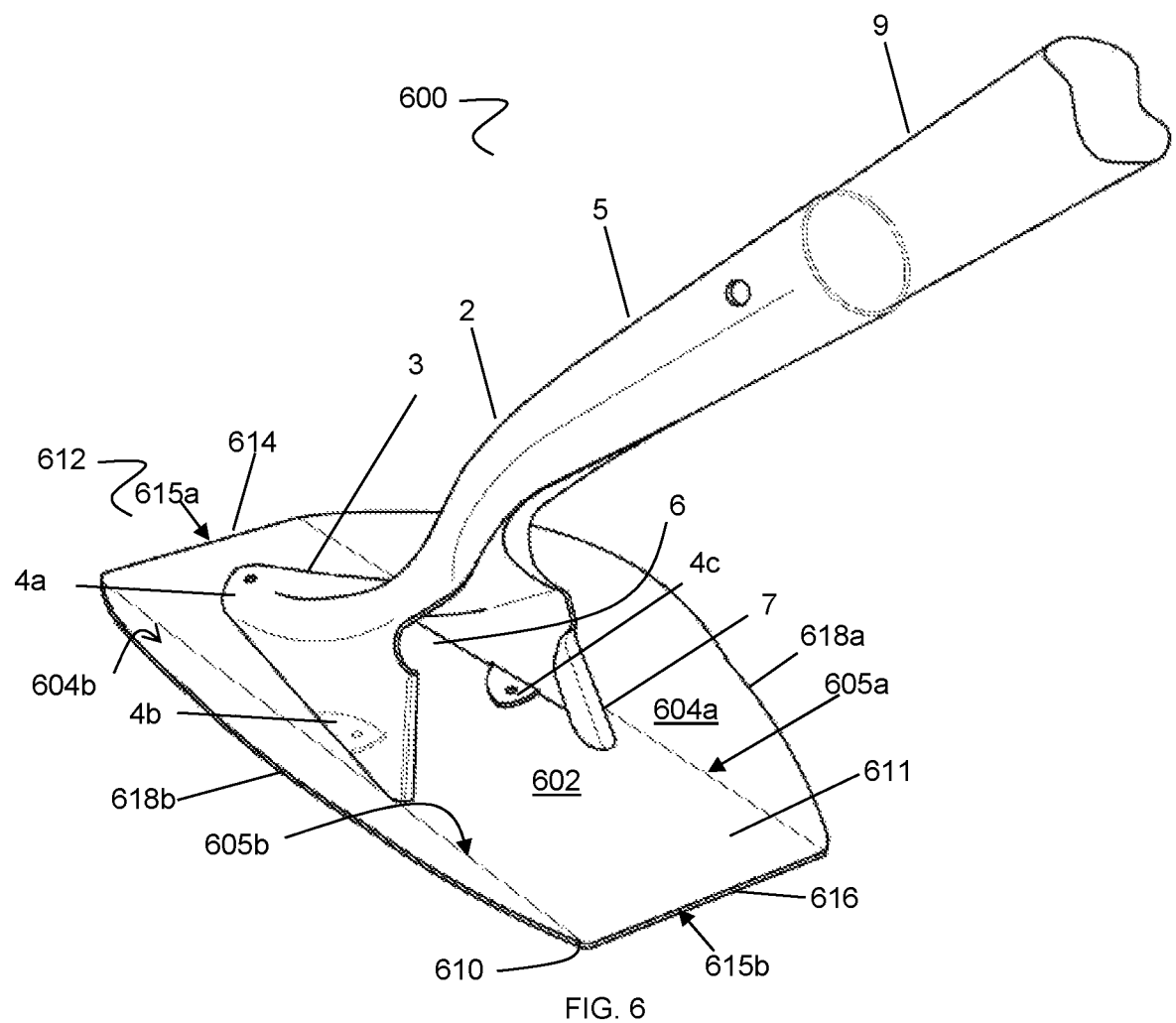
FIG. 6 is a perspective view of a shovel according to one embodiment having a blade with a flat central portion.

With reference to FIG. 6, illustrated is a blade 612 according to another embodiment. The blade 612 comprises an upper side or upper surface 611 opposite to a bottom surface 610 that faces the ground when the blade is used, a front end 614, a rear end 616 opposite to the front end 614, and side edges 618a,b extending between the front and rear ends 614, 616. According to this embodiment, the front end 614 and the rear end 616 form straight edges 615a,b that may be sharpened to enhance insertion of the shovel blade into the ground or the like, or be blunt. In this embodiment, the central portion 602 takes a rectangular form comprising two lateral sides 605a,b, the front straight edge 615a, and the rear straight edge 615b. Two upturn lateral wings or side walls 604a,b extend upwardly from the lateral sides 605a,b of the central portion 602. The lateral wings 604a,b may form a slope from the edges 618a,b to the lateral sides 605a,b or may form a vertical wall.

Figure 7:
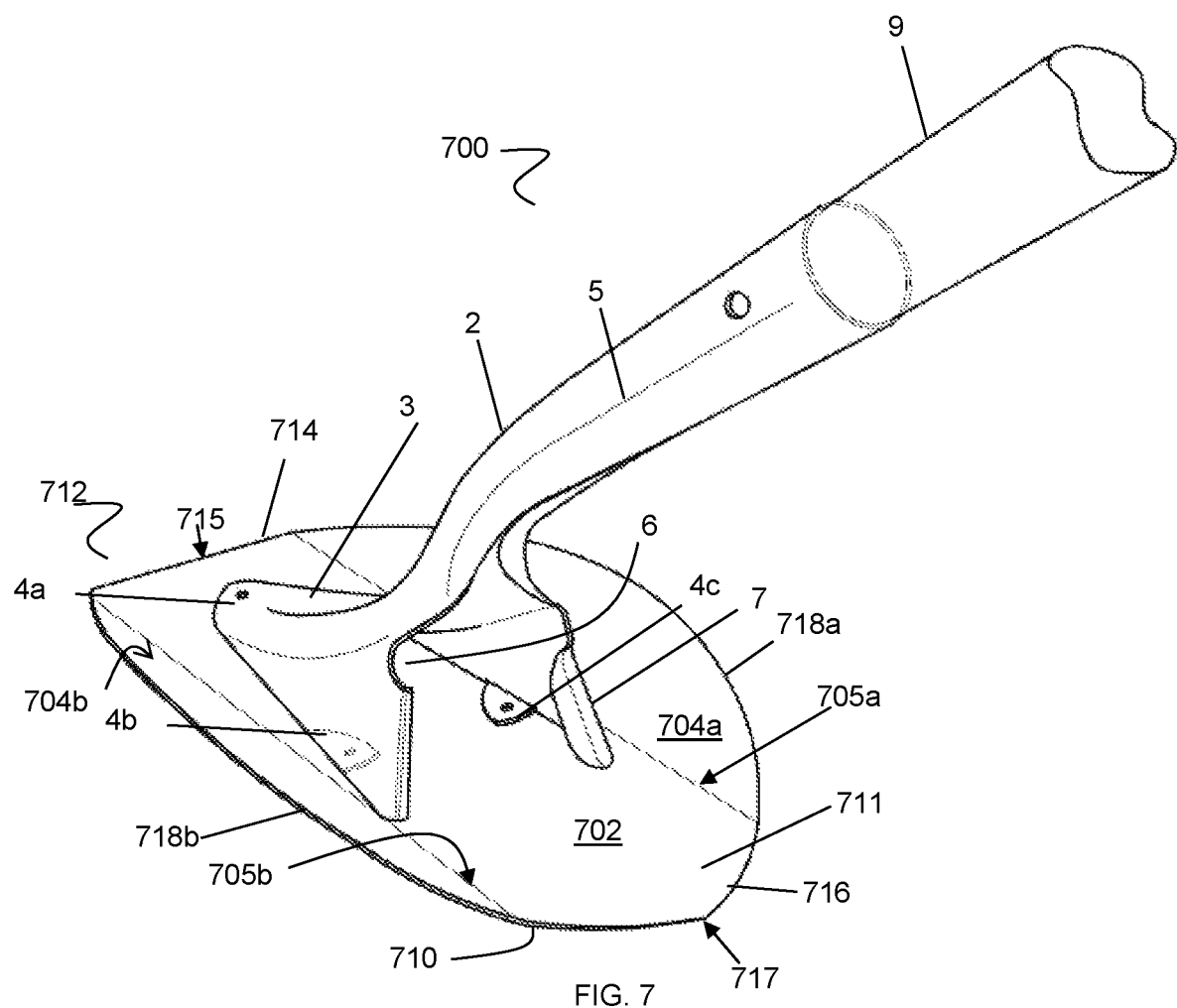
FIG. 7 is a perspective view of a shovel according to one embodiment having a blade with a flat central portion.

With reference to FIG. 7, illustrated is a blade 712 according to another embodiment. The blade 712 comprises an upper side or upper surface 711 opposite to a bottom surface 710, a front end 714, a rear end 716 opposite to the front end 714, and side edges 718a,b extending between the front and rear ends 714, 716. According to this embodiment, the front end 714 has a straight edge 715 that may be sharpened to enhance insertion of the shovel blade into the ground or the like, while the rear end 716 is pointed, for example, ends in a tip or point 717. Two upturn lateral wings or side walls 704a,b extend upwardly from the lateral sides 705a,b of the central portion 702. The lateral wings 704a,b may form a slope from the edges 718a,b to the lateral sides 705a,b or may form a vertical wall.

Figure 8:
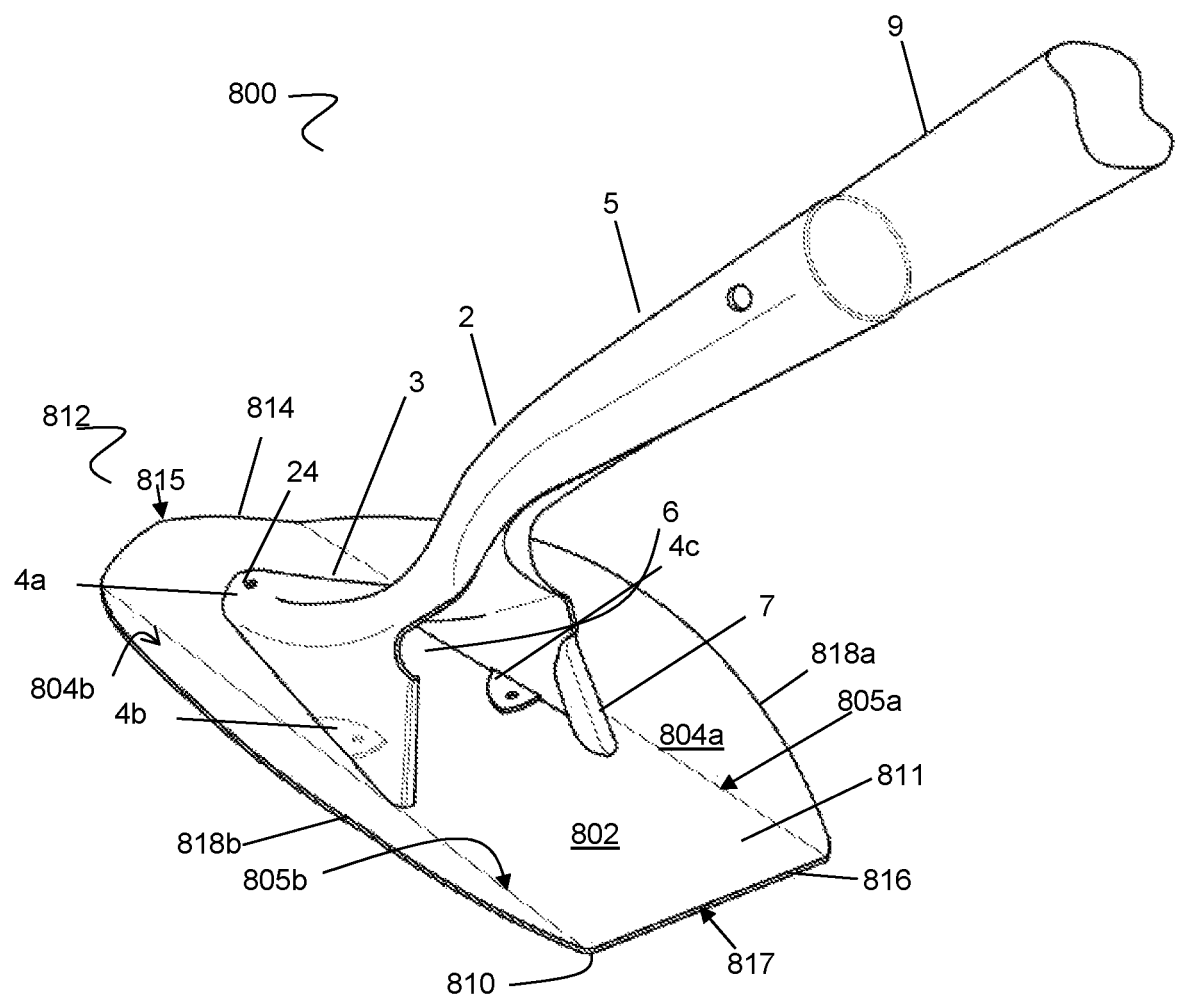
FIG. 8 is a perspective view of a shovel according to one embodiment having a blade with a flat central portion.

With reference to FIG. 8, illustrated is a blade 812 according to another embodiment. The blade 812 comprises an upper side or upper surface 811 opposite to a bottom surface 810, a front end 814, a rear end 816 opposite to the front end 814, and side edges 818a,b extending between the front and rear ends 814, 816. According to this embodiment, the rear end 816 has a straight edge 817 that may be sharpened to enhance insertion of the shovel blade into the ground or the like, while the front end 814 is pointed, for example, the front end 814 ends in a tip or point 815. Two upturn lateral wings or side walls 804a,b extend upwardly from the lateral sides 805a,b of the central portion 802. The lateral wings 804a,b may form a slope from the edges 818a,b to the lateral sides 805a,b or may form a vertical wall.

In FIGS. 1 to 8, the shovel 1, 500, 600, 700, 800 comprises,
respectively, the blade 12, 512, 612, 712, 812, a base or connector 3, a sleeve or shank 5 extending upwardly from the base 3, and a handle 9. The sleeve 5 can be adapted to receive and hold a proximal end of the handle 9. In the embodiments shown in the figures, the sleeve 5 may include a curvature 2 to facilitate the operation for the shovel. In another embodiment, the sleeve may be straight, without a curvature.

The base or connector 3 may include wings 4a,b,c (4c is shown in FIGS. 3 and 5 to 8) for connecting the base 3 to the upper surface 11 of the blade 12. In one embodiment, the base 3 may form a covered space or cave 6 having vertical side walls 7. One or both of the vertical side walls 7 may include a footrest that can be used to place the user's foot for pushing the blade 12.

With reference to FIGS. 1 to 8, the base 3 can be positioned in an area of the upper surface 11, 511, 611, 711, 811 of the blade 12, 512, 612, 712, 812 between the front 14, 514, 614, 714, 814 and rear open ends 16, 516, 616, 716, 816, at a suitable distance from the front and rear open ends that permits operation of the shovel with a forward move (for example, using the front end 14, 514, 614, 714, 814 of the blade 12, 512, 612, 712, 812) or with a backward move (for example, using the rear end 16, 516, 616, 716, 816 of the blade 12, 512, 612, 712, 812). The base 3 can be positioned in an area of the blade 12, 512, 612, 712, 812 between the front 14, 514, 614, 714, 814 and rear open ends 16, 516, 616, 716, 816 and between the lateral edges 18a,b, 518a,b, 618a,b, 718a,b, 818a,b that permits operation of the shovel with a forward move (for example, using the front end of the blade) or with a backward move (for example, using the rear end of the blade) or with a lateral move (for example, using the lateral edges). Operations of the shovel include digging, pushing, chopping, scooping, cutting, hoeing, excavating, and so forth. The handle 9 does not interfere or obstruct operation of the blade in any direction.

In one embodiment, as shown in FIGS. 1 and 3 to 8, the base 3 can be detachably connected to the blade using any suitable connector, such as screws or rivets running through holes 24 and into the blade. In another embodiment, the base may welded to the blade and also be welded to the sleeve. In one embodiment, the blade and the base may formed of a single piece and may conveniently combine the blade, the base plate, and the sleeve into the single piece. In another embodiment, the blade, the base, the sleeve and the handle may also be combined into one single piece as this configuration may facilitate the manufacture and use. In the embodiment shown in FIG. 2, the blade, base, and sleeve of the shovel 1 may be made as a single unit.

Figure 4:
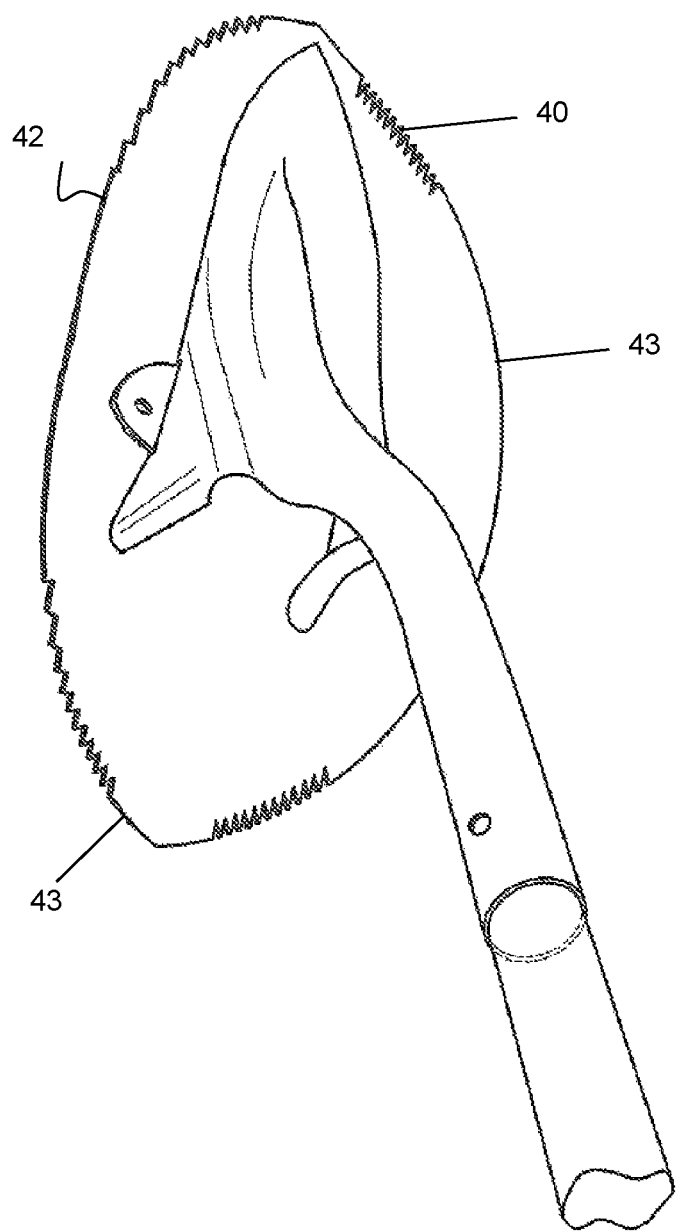
FIG. 4 is a perspective view of a shovel according to one embodiment.

The edges of the blade, including the edges of the front and rear ends and the side edges, can be equipped with serrated teeth, sharp edge without teeth (referred to as "sharp straight edge"), or straight blunt edges FIGS. 1 to 3 illustrate sharp side edges 18. FIG. 4 illustrates a blade 42 having edges 40 having serrated teeth and sharp edges 43. As such, one blade can include different types of edges. Therefore, one could switch a blade of a shovel having sharp side edges with a blade having serrated teeth or blunt edges depending on the circumstances. If using a blade including different types of edges, then one could use different sides of the blade depending on the circumstances.

In operation, the shovel can be pushed down and/or forwardly (for example, away from the user) for a desired distance with the user pressing on a footstep 7 of the shovel forcing the tip of the blade to cut in the ground or by simply pushing the blade forward with the handle. The user also has the option of pulling the shovel down and/or backwards (for example, towards the user) and using the rear tip of the blade for hoeing, chopping, and/or scooping dirt in reverse or by pulling backwards. The user also has the option of pushing the shovel side-ways or diagonally to take advantage of the blade's sharp, blunt, or serrated edges. Without having to move, a user can perform a variety of operations, such as digging, scooping, excavating, chopping, hoeing, move dirt in multiple directions using all sides of the blade, and so forth. Having a multiple-edged shovel may save time and unnecessary work by providing the user with multiple functions thus eliminating the expenditure of energy.

The base is made of stronger metal materials, such as steel, but light weight metal materials such as aluminum and the alloys thereof, or plastic materials, composite materials, and so forth, can also be used for decreasing the weight of the shovel, and for reducing the manufacturing cost for the shovel. The blade is made of stronger metal materials, such as steel, or the other stronger materials. The handle and the shaft may be made of any suitable material, such as metals, plastics or wood.

Although particular embodiments are described, other embodiments can achieve the same results. Variations and modifications will be obvious to those skilled in the art.

What is claimed is:

1. A shovel comprising:
    a continuously curved blade comprising:
        a first cutting edge and a second cutting edge opposite the first cutting edge;
        a curved central portion that extends from the first cutting edge to the second cutting edge;
        a first curved wing disposed along a first side of the curved central portion and curving away from the central portion;
        a second curved wing disposed along a second side of the curved central portion and curving away from the curved central portion;
        wherein the first curved wing extends from the first cutting edge to the second cutting edge; and
        wherein the second curved wing extends from the first cutting edge to the second cutting edge;
    a base operably coupled to the continuously curved blade and comprising:
        a first side wall coupled to a concave surface of the first curved wing;
        a second side wall spaced from the first side wall and coupled to a concave surface of the second curved wing; and
        a third side wall coupled to the curved central portion near the first cutting edge, wherein the third side wall extends between the first side wall and the second side wall, and the third side wall extends from the first side wall and the second side wall toward the first cutting edge;
    a handle operably coupled to the base.

2. The shovel of claim 1, wherein the first curved wing has an outer perimeter that is a continuously curved cutting edge, and wherein the second curved wing has an outer perimeter that is a continuously curved cutting edge.

3. The shovel of claim 1, wherein the base is at least one of riveted to the continuously curved blade and welded to the continuously curved blade.

4. The shovel of claim 1, wherein at least part of an outer perimeter of the continuously curved blade is serrated.

5. The shovel of claim 1, further comprising at least one footrest coupled to at one of the first side wall and the second side wall to facilitate pushing the continuously curved blade.

6. The shovel of claim 1, wherein the first cutting edge has a sharp point and the second cutting edge has a sham point.

7. The shovel of claim 1, wherein the continuously curved blade is configured to at least two of dig, pierce, excavate, scoop, push, chop, cut, hoe, and move dirt in at least two different directions.

8. A shovel comprising:
    a blade comprising:
        a first cutting edge and a second cutting edge opposite the first cutting edge;
        a flat central portion that extends from the first cutting edge to the second cutting edge;
        a first wing extending from the first cutting edge to the second cutting edge and disposed along a first side of the flat central portion, wherein the first wing extends away from the flat central portion at a first angle; and
        a second wing extending from the first cutting edge to the second cutting edge and disposed along a second side of the flat central portion, wherein the second wing extends away from the flat central portion at a second angle;
    a base operably coupled to the flat central portion and comprising:
        a first side wall coupled to the flat central portion near the first wing;
        a second side wall spaced from the first side wall and coupled to the flat central portion near the second wing; and
        a third side wall coupled to the flat central portion near the first cutting edge, wherein the third side wall extends between the first side wall and the second side wall, and the third side wall extends from the first side wall and the second side wall toward the first cutting edge;

a handle operably coupled to the base.

9. The shovel of claim 8, wherein the first wing has an outer perimeter that is a continuously curved cutting edge, and wherein the second wing has an outer perimeter that is a continuously curved cutting edge.

10. The shovel of claim 8, wherein the base is at least one of riveted to the flat central portion and welded to the flat central portion.

11. The shovel of claim 8, wherein at east part of an outer perimeter of the blade is serrated.

12. The shovel of claim 8, further comprising at least one footrest coupled to at one of the first side wall and the second side wall to facilitate pushing the blade.

13. The shovel of claim 8, wherein the first cutting edge has a sharp point and the second cutting edge has a straight edge.

14. The shovel of claim 8, wherein the blade is configured to at least two of dig, pierce, excavate, scoop, push, chop, cut, hoe, and move dirt in at least two different directions.

15. A shovel comprising:

a continuously curved blade comprising:
  a first curved wing having a first continuously curved cutting edge extending from a first point to a second point and having a first continuously curved surface;
  a second curved wing having a second continuously curved cutting edge extending from a third point to a fourth point and having a second continuously curved surface;
  wherein the first curved wing is adjacent to the second curved wing, wherein the first continuously curved surface and the second continuously curved surface form a concave surface, wherein the first point is opposite the second point, and the third point is opposite the fourth point;

a base operably coupled to the concave surface and comprising:
  a first side wall coupled to the first continuously curved surface of the first curved wing;
  a second side wall spaced from the first side wall and coupled to the second continuously curved surface of the second curved wing; and
  a third side wall coupled near the first point of the first wing and the third point of the second wing, wherein the third side wall extends between the first side wall and the second side wall, and the third side wall extends from the first side wall and the second side wall toward the first point of the first wing and the third point of the second wing;

a handle operably coupled to the base.

16. The shovel of claim 15, wherein the first point of the first curved wing is adjacent to the third point of the second curved wing.

17. The shovel of claim 15, wherein the second point of the first curved wing is adjacent to the fourth point of the second curved wing.

18. The shovel of claim 15, wherein the base is at least one of riveted to the continuously curved blade and welded to the concave surface.

19. The shovel of claim 15, further comprising at least one footrest coupled to at one of the first side wall and the second side wall to facilitate pushing the continuously curved blade.

20. The shovel of claim 15, wherein the continuously curved blade is configured to at least two of dig, pierce, excavate, scoop, push, chop, cut, hoe, and move dirt in at least two different directions.

* * * * *

UNITED STATES PATENT AND TRADEMARK OFFICE
CERTIFICATE OF CORRECTION

PATENT NO. : 10,617,052 B1
APPLICATION NO. : 16/356524
DATED : April 14, 2020
INVENTOR(S) : Sonny S. Galea Page 1 of 1

It is certified that error appears in the above-identified patent and that said Letters Patent is hereby corrected as shown below:

In the Claims

Column 6, Line 35: replace "at one of" with --at least one of--.

Column 6, Line 38: replace "sham" with --sharp--.

Column 7, Line 13: replace "east" with --least--.

Column 7, Line 16: replace "at one of" with --at least one of--.

Column 8, Line 29: replace "at one of" with --at least one of--.

Signed and Sealed this
Twenty-third Day of June, 2020

Andrei Iancu
*Director of the United States Patent and Trademark Office*